Sept. 15, 1964   A. G. MILLER   3,148,473

FISHING DEVICE

Filed March 29, 1962

INVENTOR.
Anthony G. Miller
BY Byron, Hume, Groen & Clement
Attorneys.

United States Patent Office 3,148,473
Patented Sept. 15, 1964

3,148,473
FISHING DEVICE
Anthony G. Miller, Chicago, Ill., assignor to
Bite-O-Lite, Chicago, Ill., a partnership
Filed Mar. 29, 1962, Ser. No. 183,558
2 Claims. (Cl. 43—17)

My invention relates to a fishing device, and more particularly, to a signal means for indicating the pull of a fish on a fishing line.

Signaling devices for giving a light signal for fishing lines have been known and used before. They are particularly adapted for night fishing because the bright signal light cutting through darkness will readily indicate the pull of a fish on the line. They also enable a fisherman to set any number of lines and leave them unattended without fear of missing a "bite." These devices, however, have not been a very practical or popular item among fishermen because they have a relatively complex mechanism and construction which results in a rather expensive and bulky device in need of frequent adjustment and repair. In addition, these devices have had no simple means or no means at all to allow for false pulls on the line caused by wind, waves, water current, or other natural phenomena.

One object, therefore, of the present invention is to provide a new and improved signaling device for fishing lines with such simplicity of construction and operation that fishermen will find it to be a great boon to night fishing.

Another object of the present invention is to provide a new and improved signaling device for fishing lines that is small, compact, inexpensive, and requires little or no maintenance or repairs.

A further object of the present invention is to provide a new and improved signaling device for fishing lines that has a simple but novel adjustment means to allow for false pulls on the line caused by wind, waves, water current, or other natural phenomena.

These objects are accomplished by the fishing device of the present invention which comprises a housing with a laterally extending rod clip or clamp, a small dry cell battery mounted in the housing, a socket at one end of the housing and electrically connected to the battery, an electric bulb received by the socket, and a firm but flexible wire at the other end of the housing for lighting the lamp by making contact with another portion of the battery for completing an electrical circuit when the wire is actuated by the pull of the fishing line engaged therewith.

Figure 1:
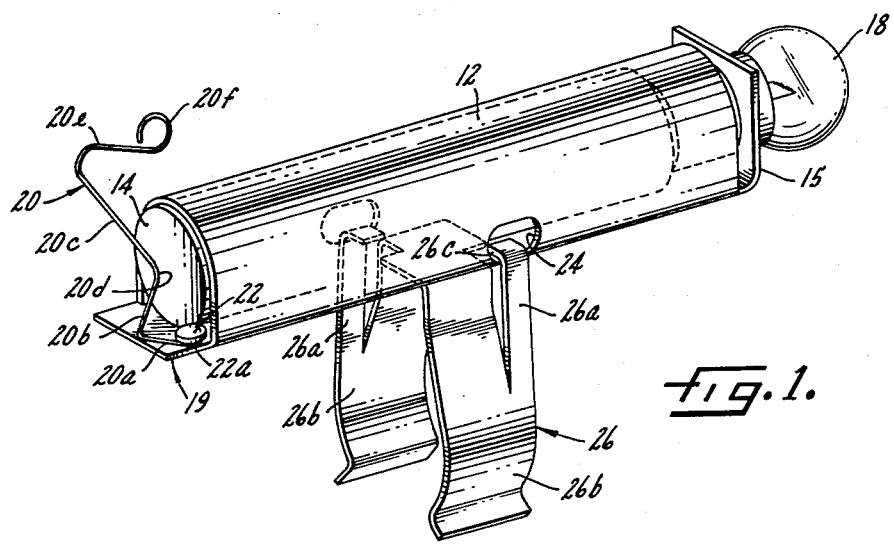
Figure 2:
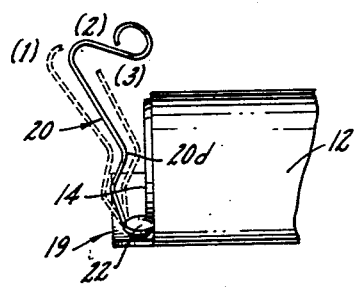
Figure 3:
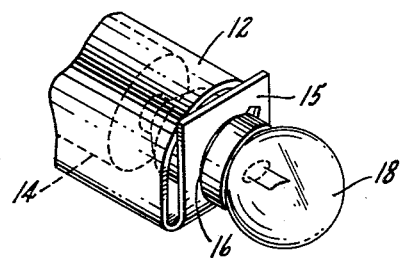

This and other objects of the invention will best be understood by reference to the following description taken in connection with the accompanying drawings in which:

FIGURE 1 is a perspective view of one embodiment of the present invention;

FIGURE 2 is a perspective view of one end of this embodiment illustrating the adjustable feature of the flexible control wire which makes electrical contact with the battery pole at one end thereof when the control wire is actuated by the pull of an associated fishing line; and FIGURE 3 is a perspective view of the other end of this embodiment illustrating the construction of the socket and the signal lamp in contact with the battery pole at the opposite end thereof.

Referring now to the drawings, and more particularly to FIGURE 1, the signal device of the present invention includes a container housing 12 made from sheet metal or any other suitable material. A dry cell battery 14 mounted within the housing 12 provides the source of electrical energy. Set back a short distance from one end of the housing 12 is a cover 15 having in its center a socket 16 for receiving an electric lamp or bulb 18 which engages the pole at one end of the battery 14.

At the other end of the housing 12 is a short, integrally formed, shelf-like or wall extension 19. On one longitudinal end of the shelf 19 is a rivet 22 which secures a firm but flexible wire 20 thereto. This wire 20 includes a bottom end portion 20a wound around the shank 22a of the rivet 22 and extending radially therefrom and is connected with a first intermediate portion 20b vertically disposed thereto. This first intermediate portion 20b is connected with a second intermediate portion 20c which is disposed away therefrom and forms an angle portion which serves as the contact point 20d for one battery pole when the wire 20 is actuated to an operating position. The second intermediate portion 20c connects with a top end portion 20e extending angularly away therefrom. This second end portion 20e has at its end an eyelet 20f for engaging a fishing line adapted to actuate the control wire 20. Although the present embodiment of my invention employs a firm, flexible wire 20 with a contact point 20d thereon, any flexible member providing a surface or projection for making contact with the pole of the battery 14 can be used.

The clamp 26, made of spring-steel or any other appropriate material, is fixed to the underside of housing 12 by two hooked arms 26a cut from each side of the clamp 26, and positioned in the holes 24 cut in the sides of the housing 12. These hooked arms 26a are made by cutting a section on each leg of the clamp 26, forming a hooked portion 26c on each end thereof, and springing the arms 26a back to fit in the holes 24 so when released they will hook onto the edges of the holes 24 and be held there by spring tension. The arms 26a also serve to prevent any shearing strain on the weld joining the clamp 26 to the housing 12.

The housing 12 of this embodiment is made from a single strip of sheet metal, but can be made from any other suitable material that can be shaped into the configuration of the housing shown in FIGURE 1. The cover 15 is also a part of this strip of sheet metal and is formed by bending up a portion of the sheet at one end of the housing 10.

As seen in FIGURE 2, the control wire 20 secured to the shelf 19 of the housing 12 by the rivet 22 can be manually rotated about the rivet 22 by a slight pressure. By such rotation, the gap between the contact point 20d and the associated battery pole can be adjusted as illustrated by positions (1), (2), and (3) in FIGURE 2. It will be seen that when the gap is relatively large, a greater degree of tension will be required to actuate the wire 20 then when the gap is relatively small.

The signal device is actuated by the pulling of a fish on a line engaged with the eyelet 20f. The line is free to run through the eyelet 20f with no interference therefrom but will run along the surface of the eyelet 20f and exert enough tension thereon to pull the wire 20 forward to close the battery circuit and light the lamp 18 when a fish pulls on the line.

If wind, waves, water current or other natural phenomena cause a pull in the line sufficient for the wire 20 to close the circuit with the battery 14, the wire can be adjusted to increase the gap between the contact point 20d and the associated terminal of the battery 14 to compensate therefor.

While the embodiment described herein is at present considered to be preferred, it is understood that various modifications and improvements may be made therein, and it is intended to cover in the appended claims all such modifications and improvements as fall within the spirit and scope of the invention.

What I claim as new is:

1. In a battery and lighting bulb fishing signal device, the combination of a battery receiving housing having a laterally extending clamp for attachment to a support and a wall extension thereon, a battery in the said housing; a firm but flexible control wire pivotally secured to said wall extension, said control wire having an end portion secured to said housing, a first intermediate portion vertically disposed to said wall extension, a second intermediate portion extending away from said first intermediate portion therebly forming an angle portion which serves as the contact point with the end of the casing of the said battery, and a top end portion extending away from said second intermediate portion and having means for engaging a fishing line to actuate said control wire and energize said lighting bulb, the said control wire being axially rotatable upon the wall extension whereby the said angle contact portion is adjustably spaced from the battery casing.

2. In a battery and lighting bulb fishing signal device, a combination of a battery receiving housing having a laterally extending clamp for attachment to a support and having a wall extension at one end thereof; a firm but flexible control wire secured to the said wall extension of the housing by means of a rivet and axially rotatable thereon; a first intermediate portion thereof vertically disposed to said wall extension, a second intermediate portion extending away from said first intermediate portion thereby forming an angle portion which serves as the contact point with the end of the casing of the said battery, and a top end portion extending away from said second intermediate portion and having means for engaging a fishing line to actuate said control wire and energize said lighting bulb, the said control wire being axially rotatable upon the wall extension whereby the said angle contact portion control wire is adjustably spaced from the said battery casing.

References Cited in the file of this patent

UNITED STATES PATENTS

| | | |
|---|---|---|
| 522,352 | Poppowitsch | July 3, 1894 |
| 1,964,949 | Janzen et al. | July 3, 1934 |
| 2,195,692 | Bushey | Apr. 2, 1940 |
| 2,619,559 | Schenkel | Nov. 25, 1952 |
| 3,024,561 | Wyatt | Mar. 13, 1962 |